US008165174B2

(12) United States Patent
Razzetti et al.

(10) Patent No.: US 8,165,174 B2
(45) Date of Patent: Apr. 24, 2012

(54) METHOD AND DEVICE FOR DEMAPPING A TRIBUTARY RECOVERING LOWER ORDER SYNCHRONISM

(75) Inventors: Luca Gabriele Razzetti, Sesto San Giovanni (IT); Sonia Rinaldi, Tirano (IT); Paolo Sorge, Carugate (IT)

(73) Assignee: Alcatel Lucent, Paris (FR)

( * ) Notice: Subject to any disclaimer, the term of this patent is extended or adjusted under 35 U.S.C. 154(b) by 710 days.

(21) Appl. No.: 11/610,515

(22) Filed: Dec. 14, 2006

(65) Prior Publication Data

US 2007/0133613 A1 Jun. 14, 2007

(30) Foreign Application Priority Data

Dec. 14, 2005 (EP) .................................. 05292695

(51) Int. Cl.
*H04J 3/06* (2006.01)
(52) U.S. Cl. .................... 370/509; 370/514; 375/365
(58) Field of Classification Search .................. 370/310, 370/345, 350, 464, 498, 503, 504, 505, 506, 370/507, 508, 509, 510, 511, 512, 513, 514, 370/516, 517, 518; 398/140, 154; 455/130, 455/205, 208; 375/354, 355, 356, 357, 358, 375/359, 362, 363, 364, 365, 366
See application file for complete search history.

(56) References Cited

U.S. PATENT DOCUMENTS

| 5,128,939 A * | 7/1992 | Takatori et al. .............. 370/509 |
| 5,361,263 A * | 11/1994 | Urbansky ..................... 370/505 |
| 5,703,915 A * | 12/1997 | Vergnes et al. .............. 375/371 |
| 2003/0161350 A1* | 8/2003 | Wolf ............................. 370/516 |
| 2007/0025397 A1* | 2/2007 | Sticht et al. .................... 370/503 |

FOREIGN PATENT DOCUMENTS

WO   WO 02098087 A1   12/2002

* cited by examiner

*Primary Examiner* — Seema S Rao
*Assistant Examiner* — Khoa Huynh
(74) *Attorney, Agent, or Firm* — Carmen Patti Law Group, LLC

(57) ABSTRACT

In a method of demapping a tributary from a first frame into a second frame, the first frame has a plurality of tributary words and a synchronization word, and first and second counters are provided. The first counter is increased by a first value at each clock cycle of the second frame, and reading operations are performed according to the second counter. Synchronization information, generated according to the synchronization word, is used to change between first and second states. When in the first state, the second counter is synchronized to the first counter at each clock cycle of the second frame; and, when in the second state, the second counter is synchronized to the first counter at a predetermined instant of the second frame, the second counter increasing by a second value at each clock cycle of the second frame wherein the reading operation is performed.

18 Claims, 8 Drawing Sheets

METHOD AND DEVICE FOR DEMAPPING A TRIBUTARY RECOVERING LOWER ORDER SYNCHRONISM

BACKGROUND OF THE INVENTION

1. Field of the Invention

The present invention generally relates to the data transmission field. More particularly, the present invention relates to a method and a device for demapping a tributary from a higher order synchronous frame to a lower order synchronous frame recovering lower order synchronism. Furthermore, the present invention relates to a network node comprising such a device.

2. Description of the Prior Art

In a synchronous transmission network, data are transported as tributary signals (or simply "tributaries") by synchronous frames, which are synchronized by a network reference clock.

Synchronous frames are typically arranged in a synchronous hierarchy. A tributary may be transported by frames of different layers of the synchronous hierarchy.

An asynchronous or plesiochronous tributary which is transported by a synchronous frame of a certain layer, before reception, is typically demapped (i.e. extracted) from the frame. Such a demapping is typically performed by a device which is termed "demapper" (or "desynchronizer").

A special application of a demapper is demapping a tributary from a frame of a certain hierarchy layer into a frame of a lower hierarchy layer, i.e. the tributary is extracted from a frame of a certain hierarchy layer and it is inserted into a frame of a lower hierarchy layer.

In the following description, for simplicity, reference will be made to an exemplary two-layer synchronous hierarchy: frames of the lower layer will be termed "lower order frames", while frames of the higher layer will be termed "higher order frames". Nevertheless, the present invention is applicable to any synchronous hierarchy, comprising any number of layers (e.g. Sonet, SDH, etc.)

A synchronous frame (either an higher order synchronous frame or a lower order synchronous frame) may comprise, in addition to the tributary, redundancy bits. Typically, such redundancy bits are used to implement error correction techniques, such as the FEC ("Forward Error Correction") technique. Number and positions of the redundancy bits in a frame are generally standardized. Further, number and positions of the redundancy bits are typically different in higher order frames and in lower order frames of a same synchronous hierarchy.

When a tributary is demapped from a higher order frame into a lower order frame, possible redundancy bits of the higher order frame are removed, and only tributary words are inserted into the lower order frame. After mapping, new redundancy bits are calculated and inserted into the lower order frame.

A synchronous frame typically comprises a frame alignment word. Frame alignment words of successive frames are typically placed at a same predefined position of the frames (i.e. frame alignment words of successive frames are spaced by a frame period). For instance, a higher order frame typically comprises, at a predefined position, a higher order frame alignment word. Besides, such a higher order frame comprise tributary and redundancy bits, wherein the tributary further comprises a lower order frame alignment word. Such a lower order frame alignment word is positioned in any position of the higher order frame.

When a tributary is demapped from a higher order frame to a lower order frame, the demapper, for properly operating, has to be capable of inserting the tributary in lower order frames so that the lower order frame alignment words of successive lower order frames are placed at a predefined position of the lower order frames. In other words, a demapper has to properly recover the lower order synchronism.

In the following description, for simplicity, the lower order frame alignment word will be briefly termed "alignment word".

Typically, a demapper receiving a higher order frame writes the tributary words (including the alignment word) in a memory, at a certain writing rate. Then, the tributary words (including the alignment word) are read from the memory at a certain reading rate.

For identifying the alignment word, in a know demapper, it is known to mark each tributary word written into the memory through a respective alignment bit. For instance, such an alignment bit may be 1 for the alignment word, and 0 for the remaining tributary words. Therefore, while reading, the alignment bit allows to recognize the alignment word, so that it can be inserted at a predefined position of the lower order frame.

In a known demapper, the writing address of each tributary word is given by a writing counter, which is incremented each time a tributary word is written into the memory. Similarly, in such a known demapper, the reading address of each tributary word is given by a reading counter, which is incremented each time a tributary word is read from the memory. Therefore, the writing counter is kept fixed while extracting redundancy bits from the higher order frame, while the reading counter is kept fixed while inserting redundancy bits into the lower order frame.

Italian patent application MI2005A001286, filed on Jul. 8, 2005, disclosed a demapper comprising a master writing counter and a master reading counter. The master writing counter is increased by a first value at each clock cycle of higher order frame, while the master reading counter is increased by a second value at each clock cycle of lower order frame. The phase error for estimating justification is calculated according to the master writing counter and the master reading counter. Furthermore, according to MI2005A001286, the demapper comprises a slave writing counter and a slave reading counter. The slave writing counter is synchronized to the master writing counter at a predetermined writing synchronization clock cycle, and it is increased at each clock cycle of the higher order frame wherein a tributary word is written into the memory. Similarly, the slave reading counter is synchronized to the master reading counter at a predetermined reading synchronization clock cycle, and it is increased at each clock cycle of the lower order frame wherein a tributary word is read from the memory. According to MI2005A001286, writing and reading operations are managed according to the slave writing counter and to the slave reading counter, respectively.

SUMMARY OF THE INVENTION

In general, an object of the present invention is providing a demapper of the type disclosed by MI2005A001286, which is adapted to demap a tributary from a higher order frame to a lower order frame, which is capable of recovering the lower order synchronism, i.e. which is capable of inserting a tributary in a sequence of lower order frames so that alignment words of successive lower order frames are placed at a same predetermined position of the lower order frames.

According to a first aspect, the present invention provides a method of demapping a tributary from a first frame into a second frame, the first frame comprising a plurality of tributary words and a synchronization word for synchronizing the second frame. The method comprises: providing a first counter and a second counter; increasing the first counter by a first value at each clock cycle of the second frame; and performing reading operations according to the second counter. It further comprises: generating synchronization information according to the synchronization word; according to the synchronization information, performing a change of state between a first state and a second state, wherein, in the first state, the second counter is synchronized to the first counter at each clock cycle of the second frame, and in the second state, the second counter is synchronized to the first counter at a predetermined instant of the second frame and the second counter is increased by a second value at each clock cycle of the second frame wherein the reading operation is performed.

According to a second aspect, the present invention provides a demapper for demapping tributary from a first frame into a second frame, the first frame comprising a plurality of tributary words and a synchronization word for synchronizing the second frame, the demapper comprising: a first register for generating a first counter which is adapted to be increased by a first value at each clock cycle of the second frame; and a second register for generating a second counter which is adapted to manage reading operations. It further comprises: a state control module for: generating synchronization information according to the synchronization word; and according to the synchronization information, performing a change of state between a first state and a second state, wherein, in the first state, the second counter is synchronized to the first counter at each clock cycle of the second frame, and in the second state, the second counter is synchronized to the first counter at a predetermined instant of the second frame and the second counter is increased by a second value at each clock cycle of the second frame wherein the reading operation is performed.

According to a third aspect, the present invention provides a network node of a telecommunication network comprising a demapper as set forth above.

The present invention will become more clear by reading the following detailed description, given by way of example and not of limitation, to be read with the accompanying drawings.

BEST MODE FOR CARRYING OUT THE INVENTION

Figure 1:
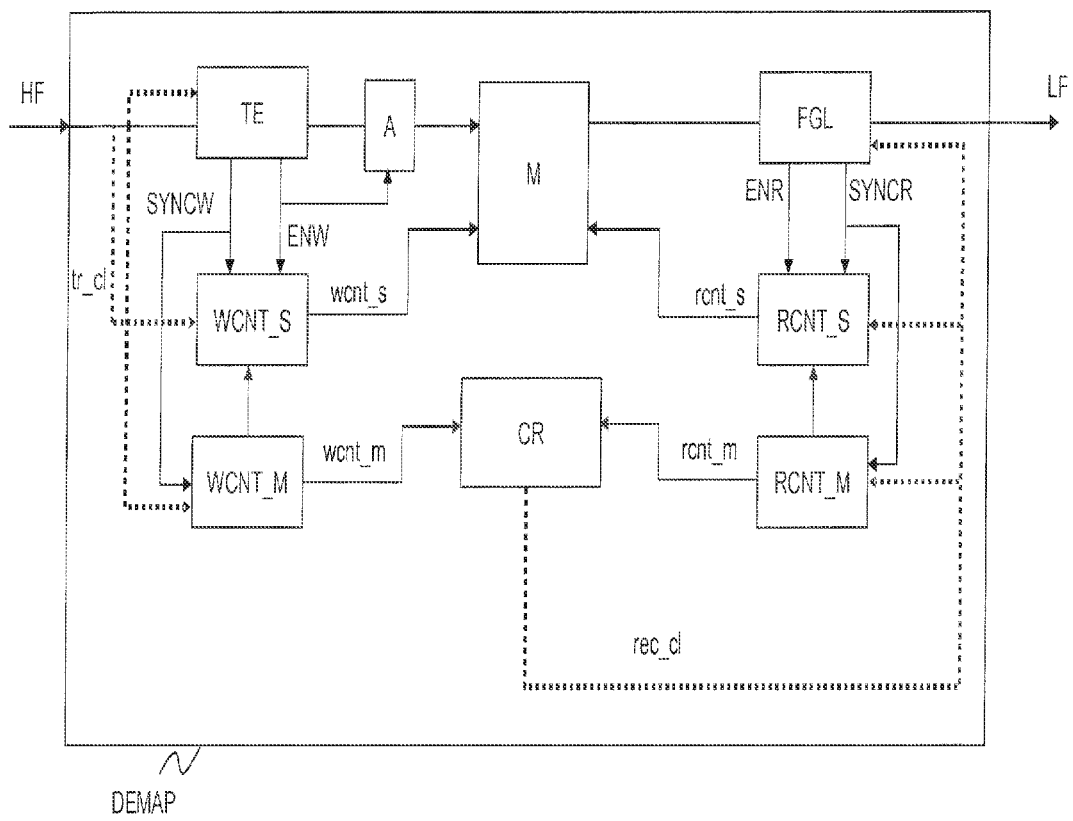
FIG. 1 schematically shows a demapper as disclosed in MI2005A001286.

FIG. 1 schematically shows a demapper according to MI2005A001286, which is adapted to demap a tributary from a higher order frame HF to a lower order frame LF.

The demapper DEMAP comprises an elastic memory M, for instance a RAM, for storing D words, each word comprising W bits, wherein a bit (typically either the first one or the last one) is the above mentioned alignment bit. Therefore, the overall memory size is D×W, D being the number of rows and W being the number of columns.

At the input of the memory M, a tributary extraction module TE is provided for extracting the tributary from the higher order frame; such a module TE is adapted to remove from the higher order frame HF the redundancy bits. The module TE then writes into the memory M the tributary words.

At the input of the memory M an aligner A is further provided, which is cascaded with the module TE. The aligner A is adapted to find the alignment word and to write into the memory M an alignment bit for each memory row, i.e. for each stored tributary word. Thanks to the alignment bit, the tributary can be properly inserted into the lower order frame LF, as it will be shown in greater detail herein after.

The demapper DEMAP of FIG. 1 further comprises a register WCNT_M, whose size is d+dw, wherein d=log 2(D) and dw=log 2(W). The register WCNT_M is adapted to receive from the module TE a writing synchronization signal SYNCW, and to generate a master writing counter wcnt_m of d+dw bits.

The demapper DEMAP further comprises a register WCNT_S, whose size is d. The register WCNT_S is adapted to receive the writing synchronization signal SYNCW and a writing enable signal ENW from the module TE. It is further adapted to receive information from the register WCNT_M, as it will be explained herein after. The register WCNT_S is adapted to calculate a slave writing counter wcnt_s of d bits, and to provide the memory M with such a counter as a writing address.

The module TE, the register WCNT_S and the register WCNT_M are synchronized by the tributary clock tr_cl, which is implicit into the tributary transported by the higher order frame HF.

At the output of the memory M, a frame generation module FGL is provided for generating the lower order frame, such a module being adapted to read tributary words from the memory M, and to insert them into the lower order frame LF.

The demapper DEMAP of FIG. 1 further comprises a register RCNT_M, whose size is d+dw. The register RCNT_M is adapted to receive from the module FGL a reading synchronization signal SYNCR, and to generate a master reading counter rcnt_m of d+dw bits.

The demapper DEMAP further comprises a register RCNT_S, whose size is d. The register RCNT_S is adapted to receive the reading synchronization signal SYNCR and a reading enable signal ENR from the module FGL. Further, it is adapted to receive information from the register RCNT_M, as it will be explained in detail herein after. The register RCNT_S is adapted to calculate a slave reading counter rcnt_s of d bits, and to provide the memory M with such a counter as a reading address.

The register WCNT_M and the register RCNT_M are connected to further modules, which are not described herein after, since they are not relevant to the present description. Such further modules are substantially adapted to perform a clock recovery function according to the values of the master writing counter wcnt_m and of the master reading counter rcnt_m, and they are generically indicated in FIG. 1 as CR.

The recovered clock rec_cl is then used to synchronize the module FGL, the register RCNT_M and the register RCNT_S.

Figure 2A:
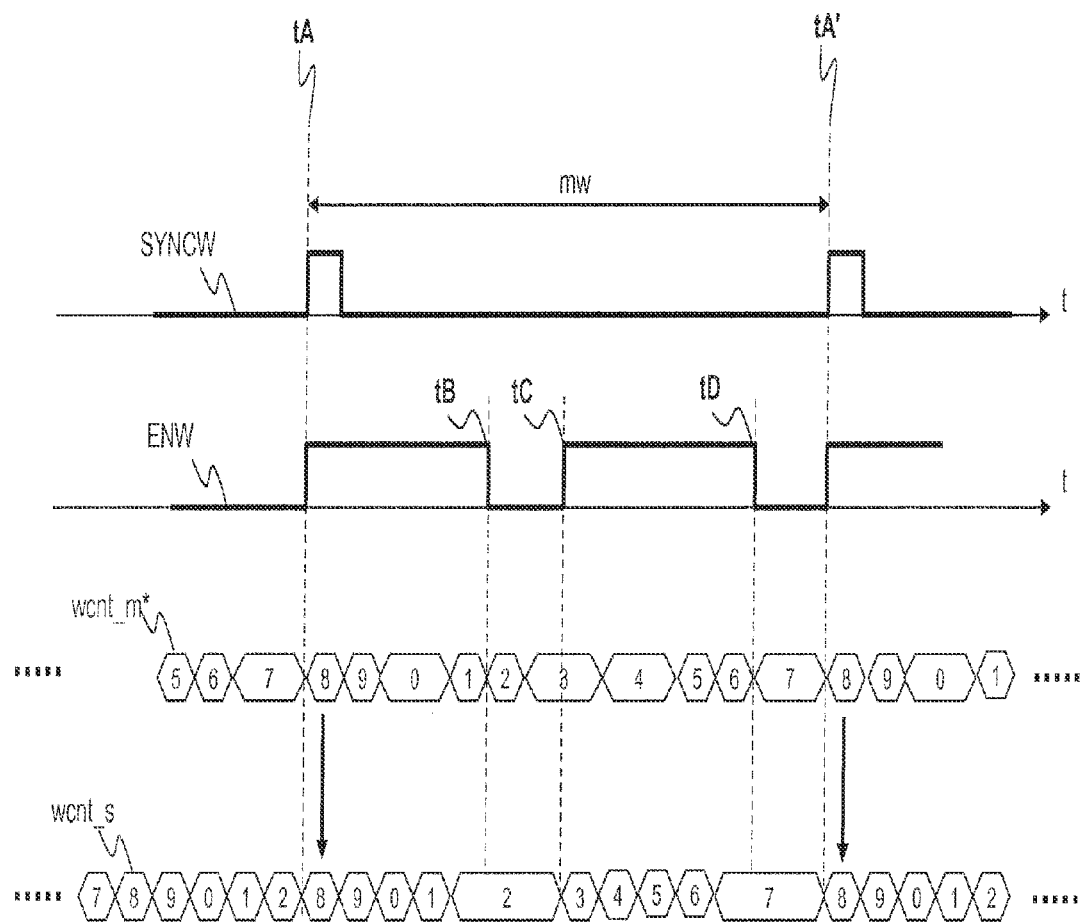
FIGS. 2a and 2b schematically show writing and reading operations, respectively, performed by the demapper of FIG. 1.
Figure 2B:
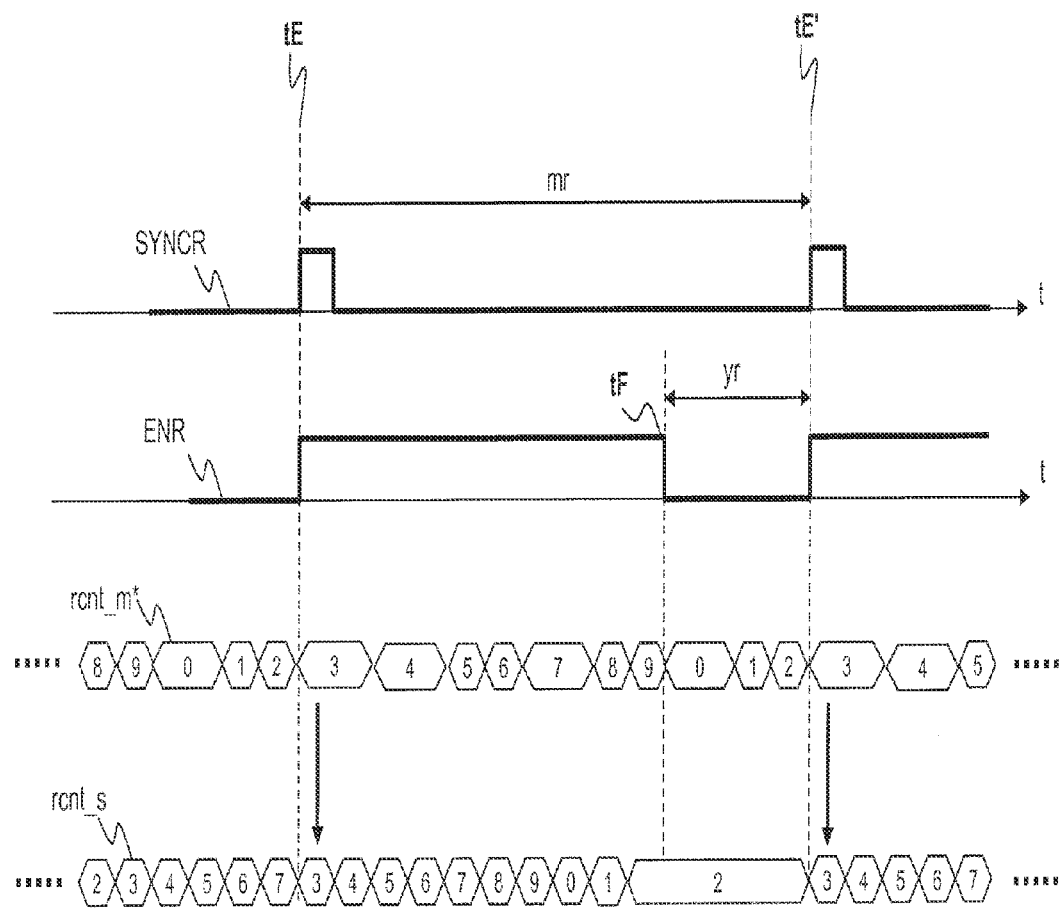

By referring to FIGS. 2a and 2b, the operation of the demapper DEMAP of FIG. 1 will be now described in detail.

The demapper DEMAP starts receiving a sequence of higher order frames HF. While the module TE and the aligner A extract redundancy bits and write tributary words into the memory M (each tributary word being associated with a respective alignment bit), at each clock cycle tr_cl the master writing counter wcnt_m is increased by a value so that, in a higher order frame period, the master writing counter wcnt_m counts a number equal to the number of tributary bits comprised in a higher order frame HF. In FIG. 2a, mw indicates the number of clock cycles comprised in a higher order frame period. Therefore, if a higher order frame HF comprises mw words, of which yw are redundancy words, the counter wcnt_m, in mw clock cycles, counts (mw−yw)*W bits.

Similarly, while the module FGL reads tributary words from the memory M and inserts redundancy bits, at each clock cycle rec_cl the master reading counter rcnt_m is increased by a value so that, in a lower order frame period, the master reading counter rcnt_m counts a number equal to the number of tributary bits comprised in a lower order frame LF. In FIG. 2b, mr indicates the number of clock cycles comprised in a lower order frame period. Therefore, if a lower order frame LF comprises mr words, of which yr are redundancy words, the counter rcnt_m, in mr clock cycles, counts (mr−yr)*W bits.

In FIGS. 2a and 2b, by way of example and not of limitation, it is assumed that mw and mr are both equal to 14, and yw and yr are both equal to 4. Therefore, in 14 clock cycles of the respective clocks tr_cl and rec_cl, both the counter wcnt_m and the counter rcnt_m count between 0 and (mw−yw−1)*W=(mr−yr−1)*W=9*W. In FIGS. 2a and 2b it is further assumed that both mw−yw and mr−yr are equal to D, i.e. to the number of rows in the memory M. Therefore, wcnt_m and rcnt_m are periodic with a period equal to mw=mr=14 clock cycles.

In FIGS. 2a and 2b, for simplicity, instead of showing the actual values of wcnt_m and rcnt_m, the values of the two following counters are shown:
    wcnt_m*=int(wcnt_m/W) and
    rcnt_m*=int(rcnt_m/W),
wherein int(·) indicates the integer function.

Moreover, for simplicity, such values are shown in decimal format, and not in binary format. Therefore, in FIGS. 2a and 2b, both the counter wcnt_m* and the counter rcnt_m* count between 0 and 9 in 14 clock cycles.

In the demapper DEMAP of FIG. 1, the module TE generates the writing synchronization signal SYNCW (as shown in FIG. 2a), while the module FGL generates the reading synchronization signal SYNCR (as shown in FIG. 2b). Such signals are periodic and they are high at a single predetermined clock cycle per frame, i.e. every mw and mr clock cycles respectively, as shown in FIGS. 2a and 2b.

When the signal SYNCW is high, for instance at a time tA, as shown in FIG. 2a, the slave writing counter wcnt_s and the master writing counter wcnt_m are synchronized each other, i.e. their values are set equal. Synchronization preferably comprises the two following operations:
    the dw less significant bits of wcnt_m are set to zero; and
    the d most significant bits of wcnt_m are forced into wcnt_s
        (as graphically shown in FIG. 2a by the vertical arrows).

FIG. 2a for instance shows that at tA the counter wcnt_m has a value so that wcnt_m* is equal to 8. At tA, the dw less significant bits of wcnt_m are set to zero (it must be noticed that this does not change the value of wcnt_m*, which is still equal to 8), and the value 8 is forced into the slave writing counter wcnt_s.

Similarly, when the signal SYNCR is high, for instance at a time tE, as shown in FIG. 2b, the slave reading counter rcnt_s and the master reading counter rcnt_m are synchronized each other, i.e. their values are set equal. Synchronization preferably comprises the two following operations:
    the dw less significant bits of rcnt_m are set to zero; and
    the d most significant bits of rcnt_m are forced into rcnt_s
        (as graphically shown in FIG. 2b by the vertical arrows).

FIG. 2b for instance shows that in tE the counter rcnt_m has a value so that rcnt_m* is equal to 3. In tE, the dw less significant bits of rcnt_m are set to zero (it must be noticed that this does not change the value of rcnt_m*, which is still equal to 3), and the value 3 is forced into the slave reading counter rcnt_s.

As already mentioned, the module TE is adapted to send to the register WCNT_S a writing enable signal ENW. For instance, such a writing enable signal ENW may be high when tributary words are written into the memory M, while it may be low when redundancy bits are extracted from the higher order frame HF. FIG. 2a shows an exemplary writing enable signal ENW. The writing enable signal ENW is high between tA and tB and between tC and tD, while it is low between tB and tC and between tD and tA'. This means that redundancy bits in the higher order frame HF are not consecutive, but they are placed between tB and tC and between tD and tA'. As a whole, they last yw=4 clock cycles.

Similarly, the module FGL is adapted to send to the register RCNT_S a reading enable signal ENR. For instance, such a reading enable signal ENR may be high when tributary words are read from the memory M, while it may be low when redundancy bits are inserted into the lower order frame LF. FIG. 2b shows an exemplary reading enable signal ENR. The reading enable signal ENR is high between tE and tF, while it is low between tF and tE'. This means that redundancy bits in the lower order frame LF are consecutive between tF and tE'. As a whole, they last yr=4 clock cycles.

According to MI12005A001286, both the slave writing counter wcnt_s and the slave reading counter rcnt_s are increased by one at each clock cycle wherein the respective enable signal ENW and ENR is high.

Therefore, as shown in FIG. 2a, between tA and tB, tributary words are written into memory, so that the signal ENW is high, and therefore the counter wcnt_s is increased by one at each clock cycle. When, at tB, redundancy bits start being extracted from the higher order frame HF, the counter wcnt_s is kept fixed to 2. When, at tC, writing operations restart, the signal ENW is high again, and therefore the counter wcnt_s is increased by one at each clock cycle. When, at tD, redundancy bits start again being extracted from the higher order frame HF, the signal ENW is low again, and the counter wcnt_s is kept fixed to a value 7.

Similarly, as shown in FIG. 2b, between tE and tF, tributary words are read from memory, so that the signal ENR is high, and therefore the counter rcnt_s is increased by one at each clock cycle. When, at tF, redundancy bits start being inserted into the lower order frame LF, the counter rcnt_s is kept fixed to 2.

Therefore, the two counters wcnt_s and rcnt_s, in mw and mr (i.e. 14) clock cycles respectively, count between 0 and (mw−yw−1)=(mr−yr−1)=9.

According to MI12005A001286, the slave writing counter wcnt_s is used by the memory M as writing address, while the slave reading counter rcnt_s is used by the memory M as reading address, As shown in FIG. 2a, after mw (=14) clock cycles, i.e. at tA', the writing synchronization signal SYNCW is high again, so that the master writing counter wcnt_m and the slave writing counter wcnt_s are synchronized each other again, as already seen at tA. Then, the operation of the demapper DEMAP is periodically repeated every mw cycles, as described above between tA and tA'.

Similarly, as shown in FIG. 2b, after mr (=14) clock cycles, i.e. at tE', the reading synchronization signal SYNCR is high again, so that the master reading counter rcnt_m and the slave reading counter rcnt_s are synchronized each other again, as already seen at tE. Then, the operation of the demapper DEMAP is periodically repeated every mr cycles, as described above between tE and tE'.

Figure 3:
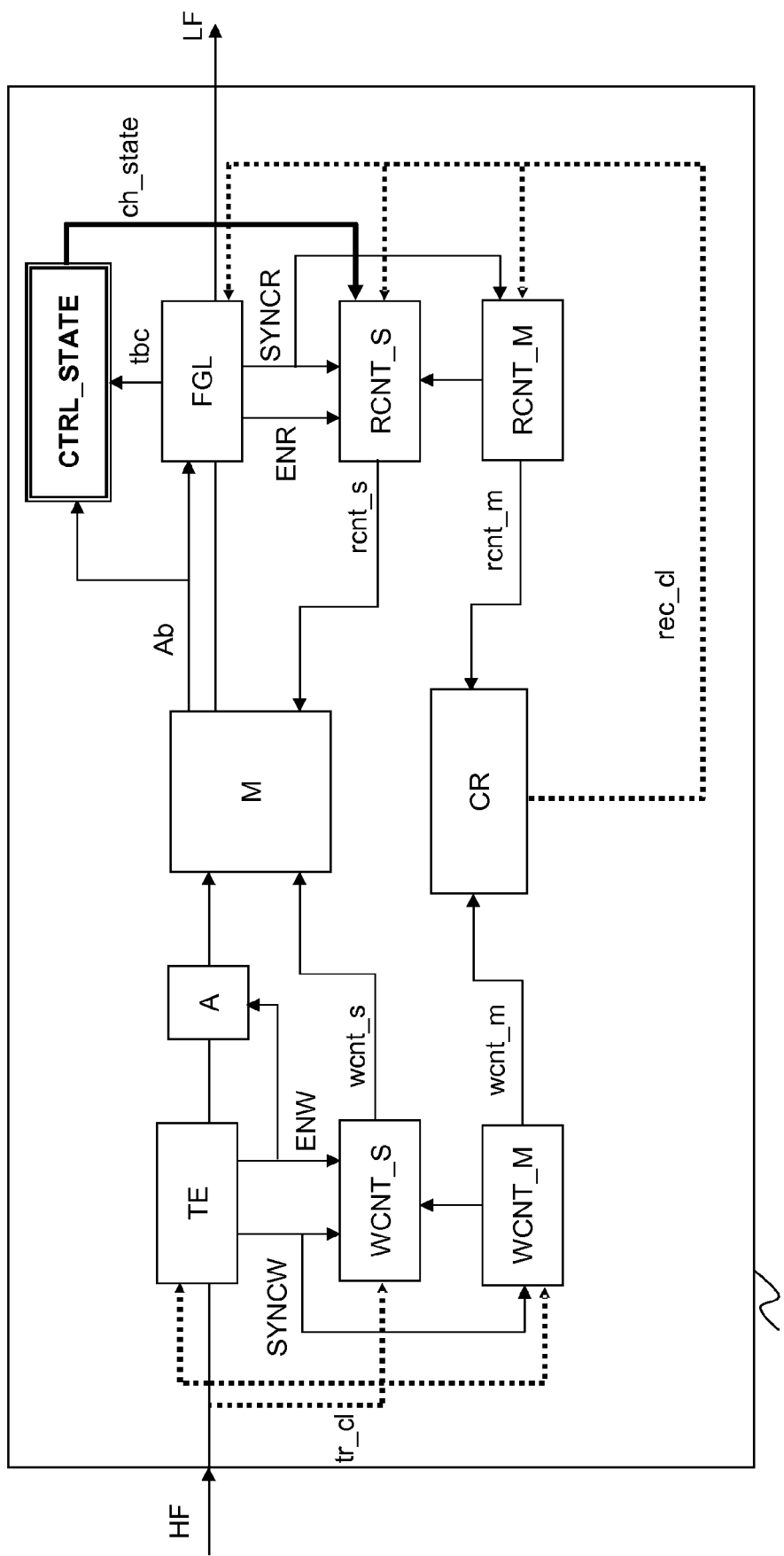
FIG. 3 schematically shows a demapper according to an embodiment of the present invention.

FIG. 3 schematically shows a demapper DEMAP' according to an embodiment of the present invention, which is capable of recovering lower order synchronism of a sequence of lower order frames LF.

The demapper DEMAP' according to an embodiment of the present invention comprises an elastic memory M, for instance a RAM, for storing D words, each word comprising W bits, wherein a bit (typically either the first one or the last one) is the above mentioned alignment bit. Therefore, the overall memory size is D×W, D being the number of rows and W being the number of columns.

At the input of the memory M, a tributary extraction module TE is provided for extracting the tributary from the lower order frame; such a module TE is adapted to remove from the higher order frame HF the redundancy bits. The module TE then writes into the memory M the tributary words.

At the input of the memory M an aligner A is further provided, which is cascaded with the module TE. The aligner A is adapted to find the alignment word and to write into the memory M an alignment bit for each memory row, i.e. for each stored tributary word. Thanks to the alignment bit, the tributary can be properly inserted into the lower order frame LF, as it will be shown in greater detail herein after.

The demapper DEMAP' of FIG. 3 further comprises a register WCNT_M, whose size is d+dw. The register WCNT_M is adapted to receive from the module TE a writing synchronization signal SYNCW, and to generate a master writing counter wcnt_m of d+dw bits.

The demapper DEMAP' further comprises a register WCNT_S, whose size is d. The register WCNT_S is adapted to receive the writing synchronization signal SYNCW and a writing enable signal ENW from the module TE. It is further adapted to receive information from the register WCNT_M, as it will be explained herein after. The register WCNT_S is adapted to calculate a slave writing counter wcnt_s of d bits, and to provide the memory M with such a counter as a writing address.

The module TE, the register WCNT_S and the register WCNT_M are synchronized by the tributary clock tr_cl, which is implicit into the tributary transported by the higher order frame HF.

At the output of the memory M, a frame generation module FGL is provided for generating the lower order frame, such a module being adapted to read tributary words from the memory M, and to insert them into the lower order frame LF.

The demapper DEMAP' of FIG. 3 further comprises a register RCNT_M, whose size is d+dw. The register RCNT_M is adapted to receive from the module FGL a reading synchronization signal SYNCR, and to generate a master reading counter rcnt_m of d+dw bits.

The demapper DEMAP further comprises a register RCNT_S, whose size is d. The register RCNT_S is adapted to receive the reading synchronization signal SYNCR and a reading enable signal ENR from the module FGL. Further, it is adapted to receive information from the register RCNT_M, as it will be explained in detail herein after. The register RCNT_S is adapted to calculate a slave reading counter rcnt_s of d bits, and to provide the memory M with such a counter as a reading address.

The register WCNT_M and the register RCNT_M are connected to further modules, which are not described herein after, since they do not fall within the scope of the present invention. Such further modules are substantially adapted to perform a clock recovery function according to the values of the master writing counter wcnt_m and of the master reading counter rcnt_m, and they are indicated in FIG. 1 as CR.

The recovered clock rec_cl is then used to synchronize the module FGL, the register RCNT_M and the register RCNT_S.

According to the embodiment of the present invention shown in FIG. 3, the demapper DEMAP' further comprises a state control module CTRL_STATE. Such a state control module CTRL_STATE is adapted to read, for each tributary word which is written into the memory, the alignment bit, to process it, and to forward to the register RCNT_S a change state signal ch_state according to the results of said processing, as it will be shown in further details herein after.

By referring to FIGS. 4, 5, 6, the operation of the demapper DEMAP' according to an embodiment of the present invention will now be described in detail.

As the writing operation of the demapper DEMAP' is substantially analogous to the writing operation of the demapper DEMAP of FIG. 1, a detailed description will be omitted.

It is only reminded that, while writing tributary words into the memory M, the aligner A writes, for each tributary word written into the memory, a respective alignment bit, which may be equal to 1 for the alignment word, while is equal to 0 for the remaining words. In the following description and in the Figures, the sequence of alignment bits read from memory by the modules FGL and CTRL_STATE will be termed "Ab". Under the above assumptions, such a signal alignment bit Ab read from memory is high while reading the alignment word from memory, and it is low while reading any other tributary word from memory.

Moreover, as it is assumed that a lower order frame LF comprises mr=14 words, among which yr=4 words are redundancy words. It is also assumed that the number D of memory rows is equal to the number mr−yr=10 of tributary words in a lower order frame LF; therefore, the alignment word is always stored at a same memory row (unless loss either of higher order synchronism or of lower order synchronism during writing operations). For instance, in FIGS. 4, 5 and 6, it is assumed that writing operations are synchronized, so that the alignment word is always stored at a memory row pointed by the memory address 4. Therefore, each time the reading address equals 4, the alignment word is read from memory, and consequently the alignment bit Ab read from memory is high.

Moreover, in the demapper DEMAP', similarly to the demapper DEMAP of FIG. 1, the slave reading counter rcnt_s is used by the memory M as reading address.

Moreover, in the demapper DEMAP', similarly to the demapper DEMAP of FIG. 1, the master reading counter rcnt_m is increased at each clock cycle by a value so that, in mr clock cycles, the counter rcnt_m counts (mr−yr)*W bits.

According to the present invention, when the demapper DEMAP' starts receiving a new sequence of higher order frames HF, the module CTRL_STATE forces the demapper DEMAP' in a first state, which will be termed "synchronization search state" or briefly "state B". In such a state B, the demapper DEMAP' starts searching the lower order synchronism.

According to the present invention, when the demapper DEMAP' is in the state B, the slave reading counter rcnt_s is synchronized to the master reading counter rcnt_m at each clock cycle, independently of the signal ENR value and of the signal SYNCR value. Therefore, during state B, the slave reading counter rcnt_s (i.e. the reading address), which is shown in FIG. 4, evolves according to the following equation: rcnt_s=rcnt_m*−int(rcnt_m/W).

It can be noticed that, according to the present invention, while searching lower order synchronism (i.e. during state B), both the signal ENR and the signal SYNCR are ignored. Indeed, the slave reading counter rcnt_s is increased at each clock cycle, and it is never kept fixed, as explained above by referring to FIG. 2b.

Moreover, according to the present invention, when the module FGL starts reading from the memory M, it starts increasing a time base counter tbc. Such a time base counter tbc is increased by one at each clock cycle rec_cl, and it is adapted to count between 0 and mr−1 (i.e. 13). Therefore, if the time base counter tbc were free-running, it would be periodic with a period equal to mr.

The time base counter tbc, according to the present invention, is the counter according to which the module FGL generates the lower order frame LF. For instance, time base counter values between 0 and mr−yr−1 (i.e. 9) induce the signal ENR to be high, so that tributary words are read from memory. On the other hand, time base counter values between mr−yr (i.e. 10) and mr−1 (i.e. 13) induce the signal ENR to be low, so that redundancy bits are inserted into the lower order frame LF.

Moreover, according to the present invention, the time base counter tbc manages the reading synchronization signal SYNCR. For instance, when the time base counter tbc is equal to zero, the signal SYNCR is high, while for all the other tbc counter values (i.e. between 1 and mr−1=13), the signal SYNCR is low.

According to the present invention, when the module FGL reads a tributary word from memory, it also reads the associated alignment bit Ab, which is high while the alignment word is read from memory.

Figure 4:
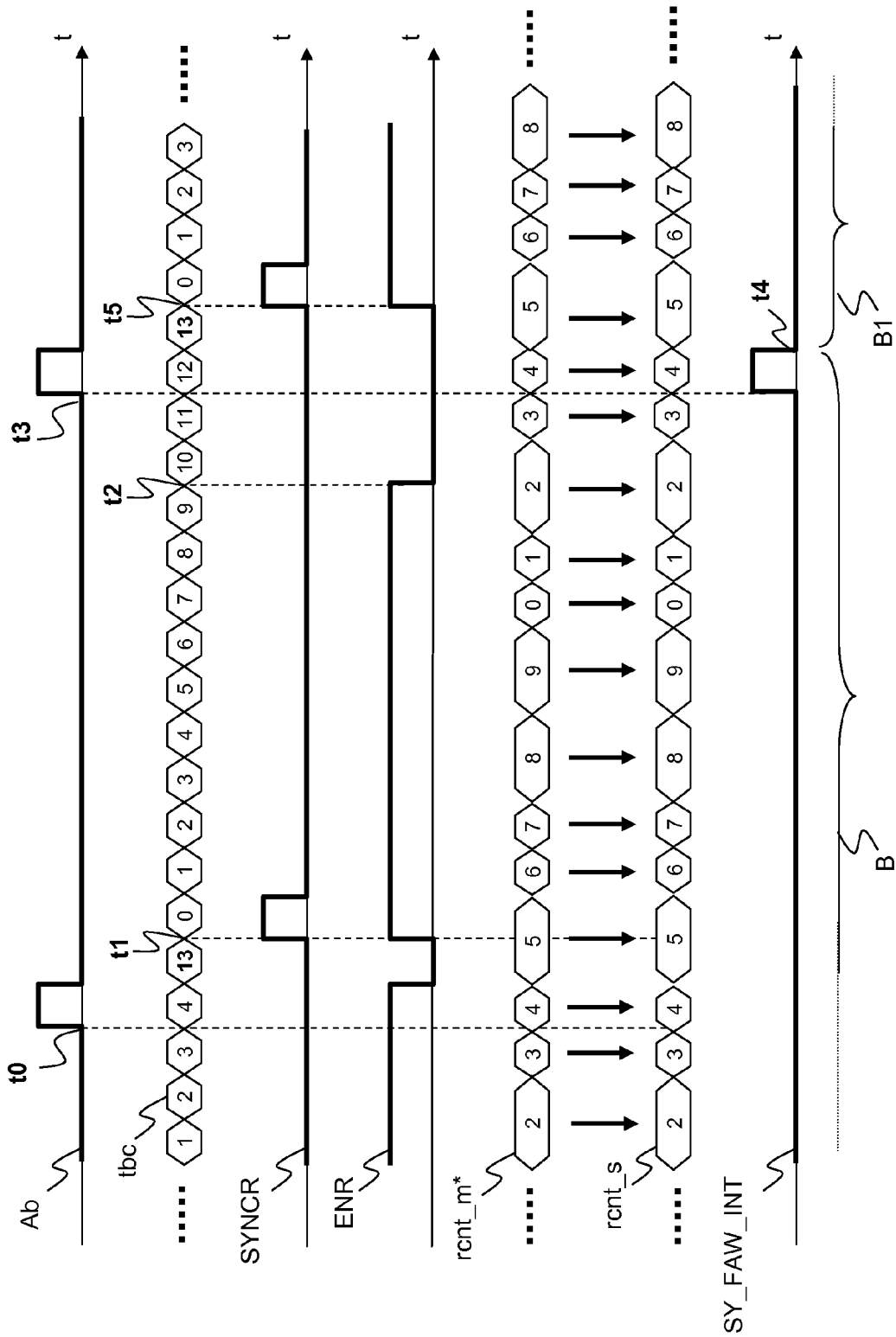
FIG. 4 schematically shows a method of demapping according to an embodiment of the present invention, in a synchronism search state.

For instance, by referring to FIG. 4, at t0 the alignment bit Ab read from memory is high. In t0, the slave reading counter rcnt_s, which indicates the reading address, is equal to 4.

According to the present invention, the time base counter tbc is free-running as long as the alignment bit Ab read from memory is low. When, during state B, the alignment bit Ab read from memory becomes high for the first time, during the next clock cycle the time base counter tbc is forced to a predefined value, which is preferably equal to mr−1 (i.e. 13). The time base counter tbc then restarts counting from 13, thus making the signals ENR and SYNCR evolve accordingly. As already mentioned, in state B the slave reading counter and the master reading counter evolve independently of the values of SYNCR and ENR, which change at the instants t1, t2 and t5. Therefore, according to the present invention, during the synchronism search state B, the slave reading counter rcnt_s evolves continuously, without showing discontinuities, as it is synchronized to the master reading counter rcnt_m at each clock cycle, and not only when the signal SYNCR is high. On the contrary, if synchronization were performed only when SYNCR is high, discontinuities could appear, as shown in FIG. 2b wherein, upon synchronization in tE, the value of the slave reading counter rcnt_s passes from 7 to 3.

In t3, the master reading counter rcnt_m is equal again to a value such that the slave reading counter rcnt_s is equal to 4. Therefore, the module FGL reads again at the memory row pointed by the reading address 4, wherein the alignment word is stored. Therefore, the alignment bit Ab read from memory is high. If the demapper DEMAP' is properly working, the instant t3 is spaced from t0 by mr (i.e. 14) clock cycles. This is due to the fact that the master reading counter rcnt_m, and therefore the synchronized slave reading counter rcnt_s, in mr clock cycles counts exactly mr−yr, i.e. it goes through the whole memory M and then it points again to the memory row pointed in t0.

According to the present invention, as mentioned above, during the clock cycle next to t3 the time base counter tbc is again forced to the predefined value mr−1.

Further, according to the present invention, the state control module CTRL_STATE generates a synchronism check signal SY_FAW_INT. During the synchronism search state B, such a synchronism check signal SY_FAW_INT is low, and becomes high only during the clock cycle wherein the time base counter tbc is equal to mr−2 (i.e. 12). This value mr−2 is chosen as it is the value assumed by the time base counter tbc while reading the alignment word from memory.

According to the present invention, the state control module CTRL_STATE checks the value of the signal SY_FAW_INT while the alignment word is read from memory, i.e. while the alignment bit Ab read from memory is high. If also the signal SY_FAW_INT is high during such a clock cycle, at t4 the state control module CTRL_STATE forces the demapper DEMAP' to change state, thus passing from the synchronism search state B to a transition state B1.

Figure 5:
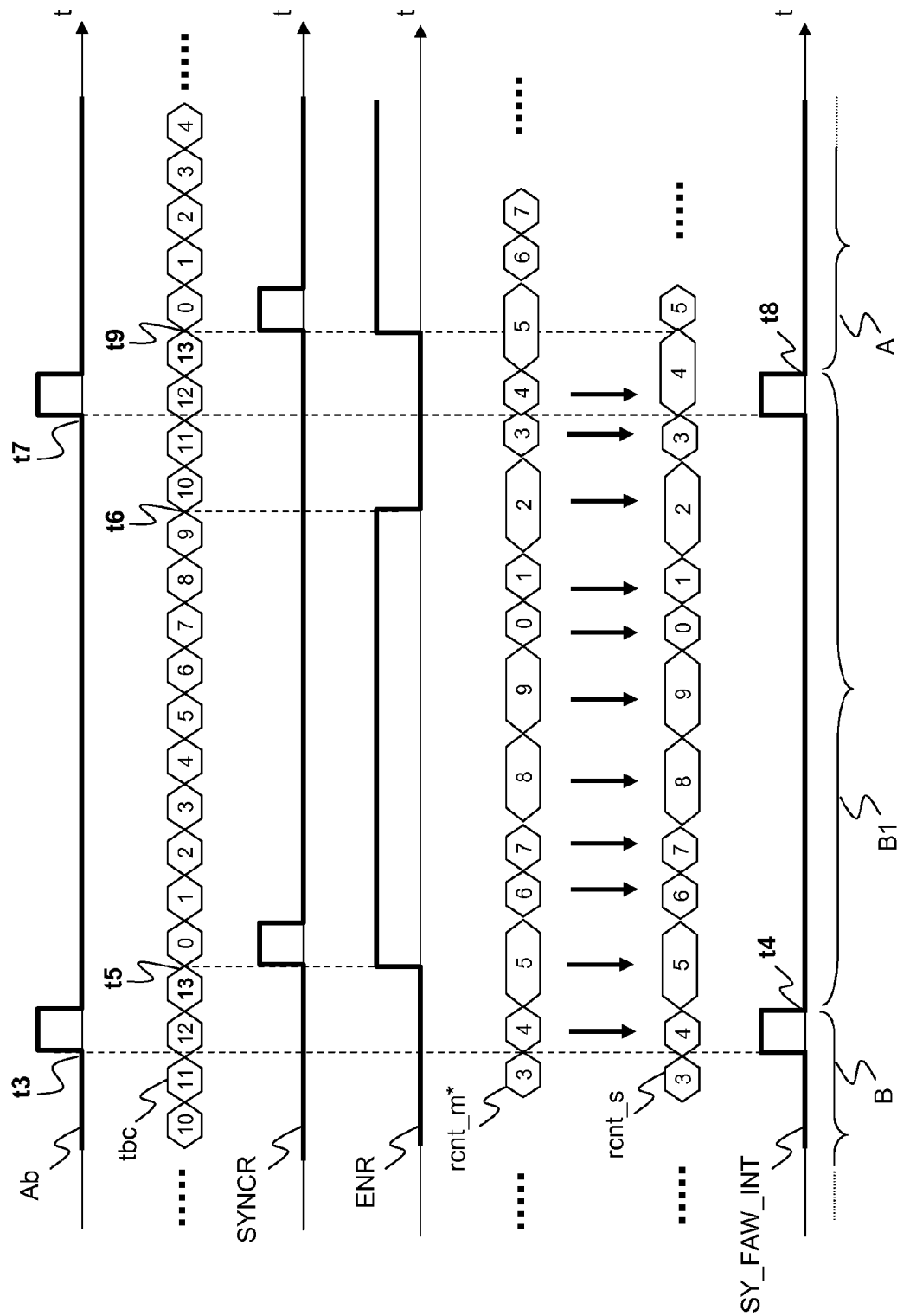
FIG. 5 schematically shows the method of demapping according to an embodiment of the present invention, in a transition state.

The operation of the demapper DEMAP' during the transition state B1 in shown in FIG. 5.

During the transition state B1, as during the synchronism search state B, the master reading counter rcnt_m and the slave reading counter rcnt_s still evolve in a continuous, synchronized way. When, at t7, the alignment word is read again from memory, i.e. the synchronization bit read from memory Ab is high again, the time base counter tbc is forced to mr−1=13 again. The signals SYNCR and ENR evolve according to the time base counter tbc. However, as in state B, the evolution of such signals SYNCR and ENR does not affect the slave reading counter rcnt_s, which is synchronized to the master reading counter rcnt_m at each clock cycle.

Moreover, as at t7 the time base counter tbc is equal to mr−2=12, the signal SY_FAW_INT is forced to be high. As in state B, the state control module CTRL_STATE checks the value of SY_FAW_INT while the alignment word is read from memory. If the value of the signal SY_FAW_INT is high, the module CTRL_STATE forces the demapper DEMAP' to change state, i.e. to pass from the transition state B to a steady state A. Otherwise, the module CTRL_STATE forces the demapper DEMAP' to go back to the synchronization search state B; this latter case will be schematically shown herein after by referring to FIG. 7a.

It can be noticed that the state control module CTRL_STATE checks twice the SY_FAW_INT value. The first check, at t3, allows the demapper to pass from the synchronization search state B, which is the initial state of the demapper DEMAP', to the transition state B1, wherein the demapper operation is substantially identical to the demapper operation in state B. The second check, at t7, allows the demapper DEMAP' to pass from the transition state B1 to a steady state A, which will be described herein after by referring to FIG. 6.

According to other embodiments of the present invention, which are not shown in the drawings, the transition state B1 may be avoided, thus passing directly, after the first check at t3, from the synchronization search state B to the steady state A. However, the embodiment shown in FIG. 5 with the transition state B1 is preferred, since it advantageously allows to have a double confirmation that lower order synchronism has been recovered. In other words, it advantageously allows to have a double confirmation that reading operation is performed so that the alignment words of successive low order frames are always placed at a predetermined position of the lower order frames, i.e. they are spaced by mr clock cycles. This assures that low order frames are properly generated (proper number of redundancy bits, redundancy bits inserted in proper positions, etc.).

It also remarked that the operation of the demapper DEMAP' during state B and state B1 is substantially identical. Therefore, for passing from state B to state B1 or vice versa, the state control module CTRL_STATE does not have to send any change control signal to any module of the demapper DEMAP'. Indeed, changing from state B to state B1 simply requires to store the result of checking the SY-FAW_INT value at t3, so that, at the next check at t7, the state control module CTRL_STATE will be able to determine whether to go back to state B or to pass to state A, as it will be shown in further detail by referring to FIG. 7a and 7b.

Figure 6:
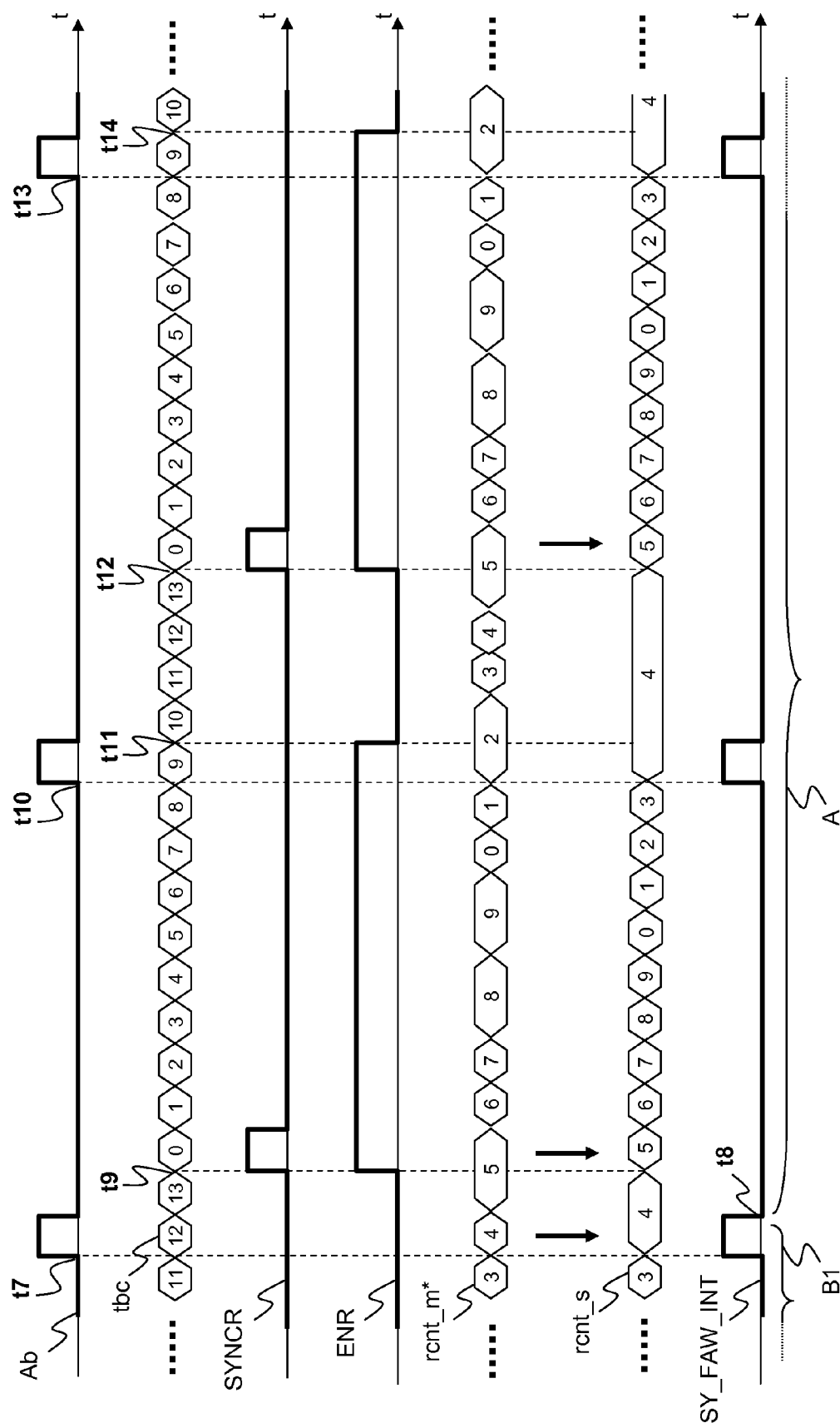
FIG. 6 schematically shows the method of demapping according to an embodiment of the present invention, in a steady state.

FIG. 6 shows the operation of the demapper DEMAP' during the steady state A, according to the present invention.

At t8, after the check performed at t7, the state control module CTRL_STATE, for forcing the demapper DEMAP' to pass to the steady state A, send a change state command ch_state to the slave reading register RCNT_S. Upon reception of such a command, the slave reading register RCNT_S starts operating as shown in FIG. 2b. Therefore, during the steady state A, the slave reading counter rcnt_s is synchronized to the master reading counter rcnt_m only when the reading synchronization signal SYNCR is high. Moreover, the slave reading counter rcnt_s is increased by one at each clock cycle wherein the reading enable signal ENR is high; otherwise, the slave reading counter rcnt_s is kept fixed to a constant value.

More particularly, by referring to FIG. 6, when at t9 the time base counter tbc is equal to 0, the signal SYNCR is high, and therefore the slave reading counter rcnt_s is synchronized to the master reading counter rcnt_m. In the following cycles, the slave reading counter rcnt_s is increased by one at each clock cycle, until, after mr−yr clock cycles, i.e. at t10, it is still equal to 4, as in t7. Therefore, as the reading address corresponds to the memory row wherein the alignment word is stored, the alignment bit Ab read from memory is high.

It is remarked that t7 and t10 (i.e. two clock cycles wherein alignment words of two successive low order frames are read from memory) are separated by mr−yr clock cycles (in FIG. 6, it can be noticed that the time base counter tbc varies from 12 to 9 between t7 and t10).

According to the present invention, during the steady state A, the time base counter tbc is free-running. Therefore, it evolves independently of the alignment bit Ab read from memory. Therefore, the time base counter tbc will evolve until, at t11, it is equal to 10, thus forcing the reading enable signal ENR to be low. Consequently, the slave reading counter rcnt_s is kept fixed from t11 to t12. At t12, the time base counter tbc is equal to 0, thus forcing the reading enable signal ENR to be high.

Further, at t12, as the time base counter is equal to 0, the reading synchronization signal SYNC is forced to be high, thus forcing the slave reading counter rcnt_s to be synchronized to the master reading counter rcnt_m.

Starting from t10, i.e. starting from the first time the alignment word is read from memory during the steady state A, the operation of the demapper DEMAP' periodically repeats every mr clock cycles. FIG. 6 only shows t13 and t14. At t3, occurring mr clock cycles after t10, the alignment word is once again read from memory. At t14, occurring mr clock cycles after t11, the time base counter tbc is equal to 10, thus forcing the signal ENR to be low, and thus forcing the slave reading counter to be fixed to a constant value.

Preferably, according to the present invention, during the steady state A, for each lower order frame a check is performed for verifying that the demapper is still properly working, i.e. the recovered lower order synchronism has not been lost.

According to the present invention, as shown in FIG. 6, during state A the state control module CTRL_STATE still generates the signal SY_FAW_INT. However, during state A, the signal SY_FAW_INT is forced to be high only when the time base counter tbc is equal to mr−yr−1=9. Then, the state control module CTRL_STATE checks the value of the signal SY_FAW_INT while the alignment word is read from memory, i.e. the alignment bit Ab read from memory is high. If the value of the signal SY_FAW_INT during such a clock cycle is high, the state control module CTRL_STATE determines that the recovered lower order synchronism has not been lost, and the demapper is still properly working.

The state control module CTRL_STATE repeats such a check for each lower order frame. Until the result of this check is positive, the demapper DEMAP' is kept in the steady state A.

However, according to the present invention, if the demapper DEMAP' looses the lower order synchronism (for instance, due to a writing error the alignment word is no more stored at the memory row pointed by the reading address 4), the state control module CTRL_STATE determines that the SY_FAW_INT value while reading the alignment word is not high. This is due to the fact that the alignment word is now read during a clock cycle which becomes different from the clock cycle wherein the time base counter tbc is equal to mr−yr−1=9.

In such a case, according to the present invention, the state control module CTRL_STATE may for instance force the demapper DEMAP' to go back directly to the synchronism search state B after a single check of the SY_FAW_INT value. Alternatively, the state control module CTRL_STATE could perform more than one check on the SY_FAW_INT value before determining that lower order synchronism has been lost and consequently that the demapper DEMAP' must be forced back to the synchronism search state B, as it will be shown herein after by referring to FIGS. 7a and 7b.

Figure 7B:
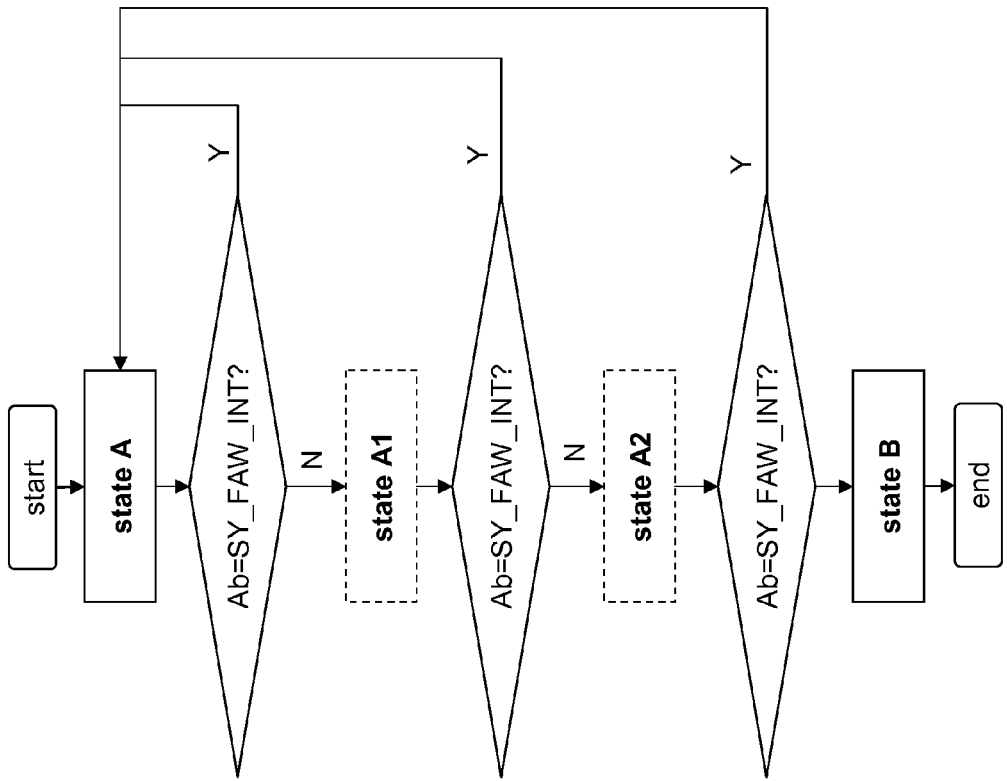
FIGS. 7a and 7b schematically shows flow diagrams for passing from a synchronism search state to a steady state and vice versa, respectively, according to embodiments of the present invention.
Figure 7A:
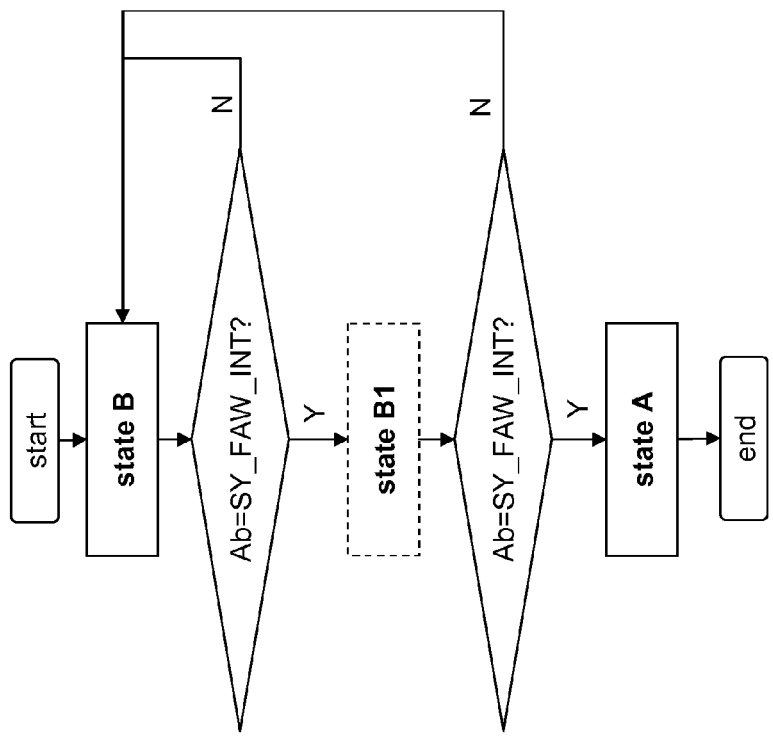

FIG. 7a shows a flow diagram for passing from the synchronism search state B to the steady state A according to an embodiment of the present invention.

According to such an embodiment, when the demapper DEMAP' starts receiving a new higher order frame sequence to be demapped, the demapper DEMAP' is in its synchronism search state B. The demapper DEMAP' is in its synchronism search state B also when, while receiving a higher order frame sequence, lower order synchronism is lost. After entering such a state B, for each lower order frame, the value of the signal SY_FAW_INT is checked at each clock cycle wherein an alignment word is read from memory (i.e. the alignment bit Ab read from memory is high). In other words, each time an alignment word is read from memory, it is checked whether Ab=SY_FAW_INT.

In the negative, it is determined that synchronism has not been recovered yet, and the demapper DEMAP' remains in its synchronism search state B.

The first time the check Ab=SY_FAW_INT is in the affirmative, the demapper DEMAP', according to such an embodiment, passes from state B to the above described transition state B1.

While in state B1, for the first lower order frame generated during state B1, it is checked whether Ab=SY_FAW_INT at the clock cycle wherein the alignment word is read from memory. In the negative, the demapper DEMAP' goes back to the synchronization search state B. Otherwise, the demapper DEMAP' passes to the steady state A.

Therefore, in the embodiment shown in FIG. 7a, changing from the synchronism search state B to the steady state B1 requires two steps. In other words, the equation Ab=SY_FAW_INT must be true for two consecutive lower order frames. This advantageously allows to have a double confirmation of having recovered lower order synchronism before passing to state A. According to other embodiments of the present invention, not shown in the drawings, the transition state B1 could be avoided. In this case, determining that Ab=SY_FAW_INT for a single lower order frame allows to change from state B to state A. According to other embodiments not shown in the drawings, more than one transition state could be provided between state B and state A.

FIG. 7b shows a flow diagram for passing from the steady state A to the synchronism search state B according to an embodiment of the present invention.

According to such a embodiment, when the demapper is properly working (i.e. it is properly generating lower order frames, as the recovered synchronism is maintained), the demapper is in its steady state A. During state A, for each lower order frame, the value of the signal SY_FAW_INT is checked at each clock cycle wherein an alignment word is read from memory (i.e. the alignment bit Ab read from memory is high). In other words, each time an alignment word is read from memory, it is checked whether Ab=SY_FAW_INT.

While in the affirmative, it is determined that the demapper DEMAP' is properly working and the lower order synchronism has not been lost, so that the demapper DEMAP' remains in its steady state A.

The first time the check Ab=SY_FAW_INT is in the negative, the demapper DEMAP', according to such an embodiment, passes from state A to a first transition state A1, as shown in FIG. 7b.

During the first transition state A1, the demapper DEMAP' still operates as in steady state A. However, the negative result of the check is stored (i.e. the demapper stores the information that lower order synchronism has been lost for a lower order frame). During state A1, it is again checked, for the first lower order frame generated during state A1, whether Ab=SY_FAW_INT at the clock cycle wherein the alignment word is read from memory. In the affirmative, the demapper DEMAP' goes back to the steady state B, as it is determined that synchronism has been lost for a single lower order frame, and therefore it is not necessary to go back to the synchronism search state B. Otherwise (Ab different from SY_FAW_INT while reading the alignment word from memory), the demapper DEMAP' passes to a second transition state A2.

During the second transition state A2, the demapper DEMAP' still operates as in steady state A. However, the negative results of the checks are stored (i.e. the demapper stores the information that lower order synchronism has been lost for two consecutive lower order frames). During state A2, it is again checked, for the first lower order frame generated during state A2, whether Ab=SY_FAW_INT at the clock cycle wherein the alignment word is read from memory. In the affirmative, the demapper DEMAP' goes back to the steady state A, as it is determined that synchronism has been lost only for a two consecutive lower order frames, and therefore it is not necessary to go back to the synchronism search state B. Otherwise (Ab different from SY_FAW_INT while reading the alignment word from memory), the demapper DEMAP' passes to the synchronism search state B.

Therefore, in the embodiment shown in FIG. 7b, changing from the synchronism search state B to the steady state A requires three steps, i.e. the equation Ab=SY_FAW_INT must be true for three consecutive lower order frames. This advantageously allows to have a triple confirmation of having lost the lower order synchronism before passing to the synchronism search state B. According to other embodiments of the present invention, not shown in the drawings, the transition states A1 and A2 could be avoided. In this case, determining that Ab is different from SY_FAW_INT for a single lower order frame allows to change from state A to state B. Similarly, only a single transition state from A to B could be provided, or any number of transition states higher that two.

Transition states advantageously allow to reduce unnecessary changes between state A and state B, that would imply unnecessary changes of the demapper operations (and in particular of its slave reading register RCNT_M).

Therefore, the present invention advantageously allows to demap a tributary from a higher order frame to a lower order frame by recovering lower order synchronism in a particularly efficient way. In fact, according to the present invention, while synchronism is searched in state B, the slave reading counter, which is indicative of the reading address, varies continuously, so that the alignment word is always read at the same lower order frame position.

We claim:

1. A method of demapping a tributary from a first frame into a second frame, said first frame comprising a plurality of tributary words and a synchronization word for synchronizing said second frame, the method comprising:

extracting the plurality of tributary words and the synchronization word from the first frame and storing them in a memory;

incrementing a master reading counter by a first value at each clock cycle of said second frame;

reading the plurality of tributary words and the synchronization word from the memory using a slave reading counter and using them to generate a second frame;

generating, by a state control module, a synchronization signal in response to reading said synchronization word from said memory;

using said synchronization signal to cause said slave reading counter to change between a first state and a second state;

synchronizing, when in said first state, said slave reading counter to said master reading counter at each clock cycle of said second frame;

synchronizing, when in said second state, said slave reading counter to said master reading counter at a predetermined instant of said second frame and increasing said slave reading counter by a second value at each clock cycle of said second frame as words are read from said memory; and if a new sequence of first frames is received, causing said slave reading counter to change from said second state to said first state, wherein said first state is a synchronization search state, wherein while said slave reading counter is in said first state, said state control module searches for the synchronization word for said second frame, wherein if said synchronization word is found, said slave reading counter transitions to said second state, and wherein said predetermined instant of said second frame at which said slave reading counter is synchronized to said master reading counter is determined based on the time of state transition from said first state to said second state.

2. The method according to claim 1, wherein said step of using said synchronization signal to cause said slave reading counter to change between a first state and a second state further comprises, in case of changing from the first state to the second state, passing through a first number of transition states, said first number being equal to or higher than 1.

3. The method according to claim 2, wherein each of said first number of transition states, said slave reading counter is synchronized to said master reading counter at each clock cycle of said second frame.

4. The method according to claim 1, wherein causing said slave reading counter to change state between the first state and the second state comprises, in case of changing from the second state to the first state, passing through a second number of transition states, said second number being equal to or higher than 1.

5. The method according to claim 4, wherein in each of said second number of transition states, said slave reading counter is synchronized to said master reading counter at a predetermined instant of said second frame and said slave reading counter is increased by a second value at each clock cycle of said second frame wherein the plurality of tributary words and the synchronization word are read from said memory.

6. The method according to claim 1, wherein said state control module receives signals generated by a third counter.

7. The method according to claim 6, wherein, in said first state, said third counter is increased by one at each clock cycle of said second frame, and it is forced to a first predefined value at each clock cycle wherein said synchronization word is read.

8. The method according to claim 6, wherein, in said second state, said third counter is increased by one at each clock cycle of said second frame.

9. The method according to claim 6, wherein said synchronization signal is adapted to switch between two different logic values.

10. The method according to claim 9, wherein, in said first state, the logic value of said signal is switched when said third counter is equal to a second predefined value.

11. The method according to claim 9, wherein, in said second state, the logic value of said signal is switched when said third counter is equal to a third predefined value.

12. The method according to claim 9, wherein the value of said synchronization signal is checked at each clock cycle wherein said synchronization word is read.

13. A demapper for demapping a tributary from a first frame into a second frame, said first frame comprising a plurality of tributary words and a synchronization word for synchronizing said second frame, the demapper comprising:

a memory for storing the tributary words and the synchronization word as they are extracted from a first frame;

a first register for generating a master reading counter which is adapted to be increased by a first value at each clock cycle of said second frame;

a second register connected to said memory for generating a slave reading counter which is used to read the tributary words and the synchronization word from the memory which are to generate a second frame, said second register having a first state wherein said slave reading counter is synchronized to said master reading counter at each clock cycle of said second frame, and a second state wherein said slave reading counter is synchronized to said master reading counter at a predetermined instant of said second frame then said slave reading counter is increased by a second value at each clock cycle of said second frame;

a state control module connected to the memory and the second register for:

generating a synchronization signal in response to reading said synchronization word from the memory;

in response to said signal, changing the state of the second register between a said first state and said second state; and if a new sequence of first frames is received, changing the state of the second register from said second state to said first state, wherein said first state is a synchronization search state, wherein while in said first state said state control module searches the for synchronization word for said second frame, and, if said synchronization word is found, said state control module causes the second register to transition to said second state, and wherein said predetermined instant of said second frame at which said slave reading counter is synchronized to said master reading counter is determined based on the time of state transition from said first state to said second state.

14. The demapper according to claim 13, wherein said state control module, in case of changing from the first state to the second state, performs the change of state passing through a first number of transition states, said first number being equal to or higher than 1.

15. The demapper according to claim 13, wherein said state control module, in case of changing from the second state to the first state, performs the change of state passing through a second number of transition states, said second number being equal to or higher than 1.

16. A network node of a telecommunication network, for demapping tributary from a first frame into a second frame, said first frame comprising a plurality of tributary words and a synchronization word for synchronizing said second frame, comprising:

a demapper, comprising:

a memory for storing the tributary words and the synchronization word as they are extracted from a first frame;

a first register for generating a master reading counter which is adapted to be increased by a first value at each clock cycle of said second frame;

a second register connected to said memory for generating a slave reading counter which is used to read the tributary words and the synchronization word from the memory which are used to generate a second frame, said second register having a first state wherein said slave reading counter is synchronized to said master reading counter at each clock cycle of said second frame, and a second state wherein said slave reading counter is synchronized to said master reading counter at a predetermined instant of said second frame then said slave reading counter is increased by a second value at each clock cycle of said second frame;

a state control module for:
generating a synchronization signal in response to reading said synchronization word from the memory;

in response to said signal, changing the state of the second register between a said first state and said second state; and if a new sequence of first frames is received, changing the state of the second register from said second state to said first state, wherein said first state is a synchronization search state, wherein while in said first state said state control module searches the for synchronization word for said second frame, and, if said synchronization word is found, said state control module causes the second register to transition to said second state, and wherein said predetermined instant of said second frame at which said slave reading counter is synchronized to said master reading counter is determined based on the time of state transition from said first state to said second state.

17. The network node according to claim 16, wherein said state control module, in case of changing from the first state to the second state, performs the change of state passing through a first number of transition states, said first number being equal to or higher than 1.

18. The network node according to claim 16, wherein said state control module, in case of changing from the second state to the first state, performs the change of state passing through a second number of transition states, said second number being equal to or higher than 1.

* * * * *